Aug. 10, 1937.  F. CARLSSON  2,089,782
PROCESS OF PRODUCING SPONGE IRON
Filed Dec. 14, 1934
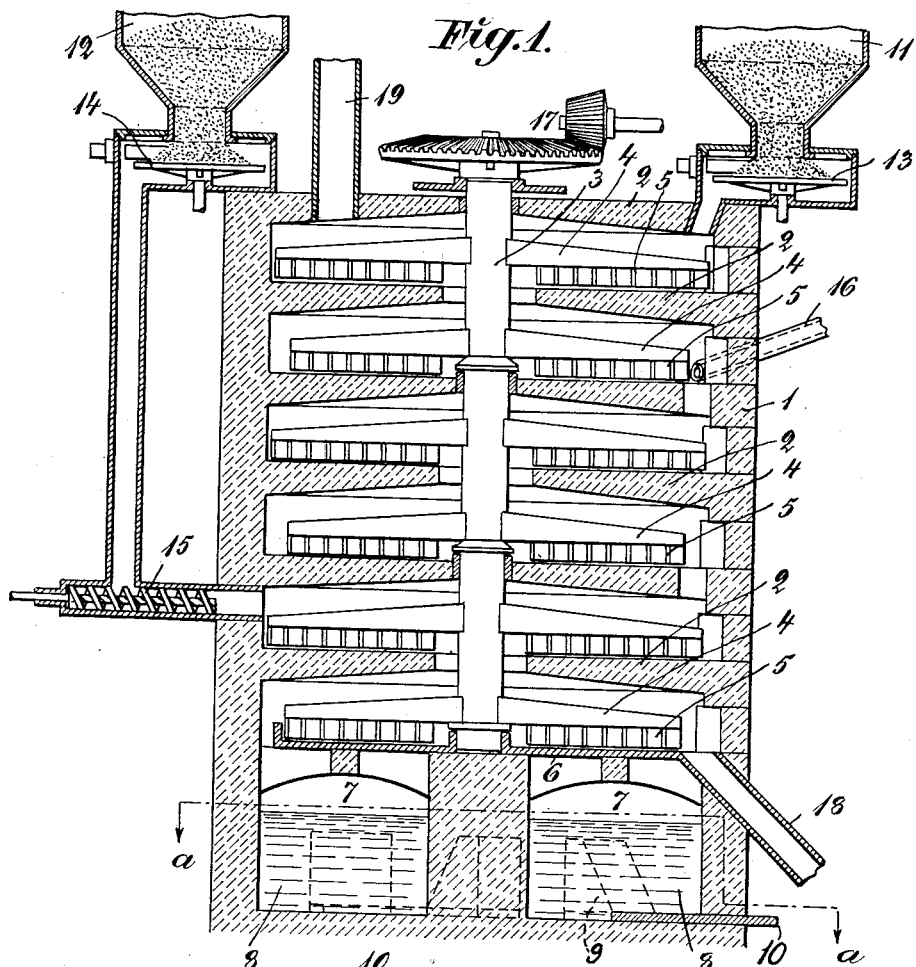
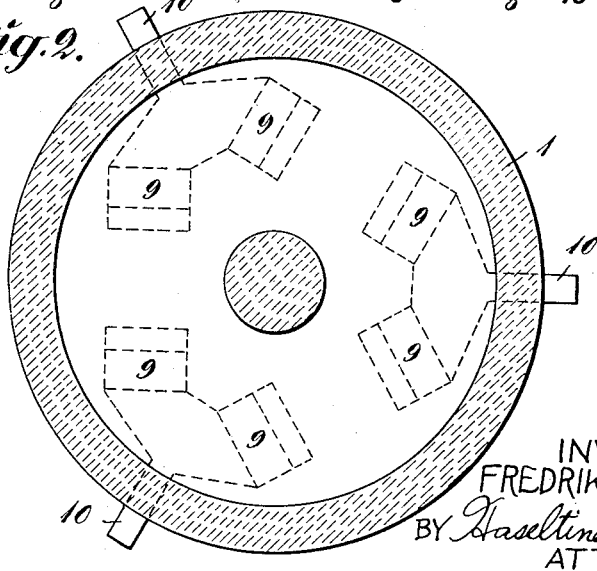
INVENTOR:
FREDRIK CARLSSON
BY Haseltine Lake & Co.
ATTORNEYS Patented Aug. 10, 1937

2,089,782

UNITED STATES PATENT OFFICE 2,089,782

PROCESS OF PRODUCING SPONGE IRON

Fredrik Carlsson, Stockholm, Sweden, assignor to Aktiebolaget Industrimetoder, Stockholm, Sweden, a limited company Application December 14, 1934, Serial No. 757,476

1 Claim. (Cl. 75—11)

The present invention relates to the production of sponge iron from iron ore, especially iron ore concentrate, and has for its object to provide an improved method for said purpose.

As is well known, in the production of sponge iron through reduction of iron ore the reducing means used has either been a reducing gas or a solid reducing material, for instance coke, charcoal or the like.

From a theoretical point of view the use of a solid reducing material is more favourable, as in that case the quantity of reducing material required for carrying out the reduction of the ore is considerably lower than if a gaseous reducing means is employed.

When using a solid reducing material in accordance with the methods hitherto practiced, it has, however, been found that the attainment of an effective and quick reduction is dependent on certain necessary conditions, the practical realization of which has been rather difficult. Care should for instance be taken that the ore and the reducing material used during the whole reduction period are being kept intimately mixed with one another, and further should the quantity of heat that is required for carrying out the strongly endothermic reaction of the reducing process be supplied in such a manner that sticking to the furnace walls of half sintered material can be avoided.

A necessary condition for producing the above-mentioned intimate contact between the ore and the reducing material is that the ore to be treated as well as the reducing material is used in a finely divided state. Such a finely divided material, however, has a very bad heat conductivity, and in order to facilitate the heat transmission and more uniformly distribute the heat to all parts of the treated material, said heat transmission is promoted by a successive replacement of the particles of the material during the treatment.

The present invention now relates to a process for the production of sponge iron from iron ore concentrates and a finely divided reducing material in such a way that the disadvantages connected with the said known processes are removed. By means of said process it is rendered possible to carry out the process rapidly and effectively and at the same time all sticking together of the charge can be avoided.

The process according to the invention is described below with reference to the accompanying drawing, which by way of example shows a suitable furnace for carrying out said process according to the invention.

In the drawing, Fig. 1 is a vertical section through the furnace and

Fig. 2 is a horizontal section along the line a—a in Fig. 1.

In the drawing 1 is a cylindrical furnace with a number of superimposed hearths, 2 are arches constituting said hearths, and 3 a vertical central shaft supporting arms 4 preferably air- or water-cooled and provided with rabbles 5 for stirring the material and taking it from one hearth to the hearths below. The bottom 6 of the lowermost hearth is made of carborundum, fire resisting special steel or another material possessing a good heat conductivity. 7 is a chamber holding a molten bath of a glassy material, such as glass, slag or the like, which is heated electrically by means of the electrodes 9 and the collecting bars 10. For supply of ore and solid reducing material are arranged hoppers 11 and 12 and 13, 14, 15 are feeding devices for introducing said materials into the furnace, the arrangements for driving said devices being not shown in the drawing. The pipe 16 is a blast pipe for introducing air into the furnace, 17 is an arrangement for driving the central furnace shaft 3, 18 is a chute for discharging the finished sponge iron, and 19 is an outlet for the gases from the furnace.

In said furnace the process according to the invention is carried out in the following manner.

The finely divided ore is charged continuously from the hopper 11 on to the uppermost hearth of the furnace and moved to the center of said hearth under constant stirring by means of the corresponding rabbling arm 4. From here it drops on to the second hearth, passes over this to its periphery in the same manner, drops on to the third hearth and so on. The finely divided solid reducing material contained in the hopper 12, for instance coke, is also introduced continuously (in the mode of execution shown on the drawing at the periphery of the fifth hearth from the top) and is then by means of the stirring influence exerted by the rabbles evenly distributed among the ore and intimately mixed up with the ore material.

When passing over the upper hearths the ore, as will be described below, is preheated to such a high temperature that upon the introduction of the reducing material the reduction immediately begins. During the passage over the lowest hearths the reduction goes on, and the speed of the furnace is regulated in such a way that the ore is perfectly reduced to iron sponge before leaving the furnace through the chute 18. The heat required for the reduction process is supplied by radiation from the molten bath 8, which by regulating the supply of electric current to the electrodes can be kept at a fixed temperature, so as to effect an even and sufficient heating of the charge. It is also possible thereby to avoid such temporary overheating as would cause a sticking together of the charge or a sticking to the bottom of the lowermost hearth which always has a higher temperature than the charge itself.

The gas resulting from the reduction process—consisting mainly of carbon monoxide (CO)—from the lower part of the furnace ascends upwards through the furnace where it meets the air let in through the blast pipe 16 on the second hearth from above and is burnt. Hereby such an amount of heat is generated that the ore, as mentioned above, when passing downwards over the upper hearths is preheated sufficiently for reacting with the reducing material immediately after the latter has been introduced into the furnace.

If it should be found desirable, also the reducing material before introduction into the furnace can be preheated by means of the combustion gases escaping from the furnace which, as a rule, contain more heat than is necessary for the preheating of the ore.

According to the invention, also the preheated ore before being brought in contact with the solid reducing material may be subjected to a pre-reduction by means of the gas generated in the reduction zone proper at the reaction between the ore and the solid reducing material. For that purpose the air destined for burning said reduction gas instead of being introduced into the furnace at the hearth immediately above that where the reducing material is introduced, may be introduced at a place higher up in the furnace, which in that case preferably is provided with a larger number of hearths. By this manner of working, there will be a zone of heated ore between the reduction zone proper and the zone where the preheating of the ore is carried out, cut off from the air, where said pre-reduction of the ore by means of the reduction gases takes place.

Selfevidently, the invention is not limited to the manner of carrying out the process described above, which is only given by way of example. Thus, for instance, as already indicated above, the furnace can have any suitable number of hearths, of which in relation to the properties of the ore any suitable number may be employed for each of the different steps constituting the process. Further the furnace employed may be any sort of multiple hearth furnaces equipped with stirring arrangements, provided the furnace is so arranged that the reducing gas can be burnt in order to preheat the ore and that the heat is supplied to the reduction chamber by means of radiation from an electrically heated molten bath.

Having now particularly described the nature of my invention and the manner of its operation, what I claim is:

A process of producing sponge iron from iron ore concentrate in a furnace containing a number of superimposed hearths, wherein the ore under perpetual stirring is continuously passed downwards from hearth to hearth, which in a combined group of steps comprises introducing the iron ore concentrate onto the top hearth of the furnace, preheating the ore on the hearths in the upper part of the furnace by means of combustion gases generated by burning the reduction gases passing upwards from the lower part of the furnace with air introduced in the upper part of the furnace, subjecting the preheated ore during its passage further downwards to a preliminary reduction by means of said reduction gases before their arrival to the preheating zone, subsequently to said preheating mixing the heated, partly reduced ore with a finely divided solid reducing material, reducing the ore completely in the lower part of the furnace by means of said solid reducing material, and discharging the finished sponge iron from the bottom hearth of the furnace, the heat required for the reduction process being supplied by radiation from an electrically heated molten bath of glassy materials.

FREDRIK CARLSSON.